(12) United States Patent
Gross et al.

(10) Patent No.: US 11,866,148 B2
(45) Date of Patent: Jan. 9, 2024

(54) AIRCRAFT FLOORING AND METHODS OF MANUFACTURING THE SAME

(71) Applicant: SciMax Technologies, LLC, Long Beach, NY (US)

(72) Inventors: Max Gross, Long Beach, NY (US); Joseph Bruno, Long Beach, NY (US)

(73) Assignee: SCIMAX TECHNOLOGIES, LLC, Long Beach, NY (US)

( * ) Notice: Subject to any disclaimer, the term of this patent is extended or adjusted under 35 U.S.C. 154(b) by 674 days.

(21) Appl. No.: 17/008,467

(22) Filed: Aug. 31, 2020

(65) Prior Publication Data
US 2021/0016899 A1    Jan. 21, 2021

Related U.S. Application Data

(63) Continuation-in-part of application No. 15/625,262, filed on Jun. 16, 2017, now Pat. No. 10,759,513.

(51) Int. Cl.
*B64C 1/18* (2006.01)
*B29C 65/02* (2006.01)
*B64C 1/00* (2006.01)

(52) U.S. Cl.
CPC .............. *B64C 1/18* (2013.01); *B29C 65/02* (2013.01); *B64C 2001/0072* (2013.01)

(58) Field of Classification Search
CPC ... B64C 1/18; B64C 2001/0072; B29C 65/02; B29C 66/524; B29C 66/721; B29C 66/72141; B29C 66/81455; B32B 37/10; B32B 38/1866
See application file for complete search history.

(56) References Cited

U.S. PATENT DOCUMENTS

| | | |
|---|---|---|
| 5,647,184 A | 7/1997 | Davis |
| 6,199,340 B1 | 3/2001 | Davis |
| 6,769,217 B2 | 8/2004 | Nelson |
| 7,322,299 B2 | 1/2008 | Greene |
| 7,998,299 B2 | 8/2011 | McCarville et al. |
| 8,440,045 B2 | 5/2013 | Bremmer et al. |
| 8,834,667 B2 | 9/2014 | McCarville et al. |
| 9,114,588 B2 | 8/2015 | Oefner |
| 9,506,245 B2 | 11/2016 | Mackintosh |

(Continued)

FOREIGN PATENT DOCUMENTS

| | | |
|---|---|---|
| EP | 3162551 A1 | 5/2017 |
| WO | 2014008536 A1 | 1/2014 |

*Primary Examiner* — Christopher T Schatz
(74) *Attorney, Agent, or Firm* — CARTER, DELUCA & FARRELL LLP

(57) ABSTRACT

A floor panel for installation in an aircraft includes a plurality of thermoplastic C-shaped stringers, a consolidated thermoplastic deltoid filler, a thermoplastic upper facing sheet, and a thermoplastic lower facing sheet. The stringers are disposed in a parallel arrangement with one another. The deltoid filler is disposed within a longitudinally-extending notch defined by a pair of adjacent stringers. The upper facing sheet covers an upper surface of the stringers and the deltoid filler. The lower facing sheet covers a lower surface of the stringers and the deltoid filler. The stringers, the deltoid filler, and the upper and lower facing sheets are integrally consolidated forming a unitary construction.

9 Claims, 6 Drawing Sheets

(56) References Cited

U.S. PATENT DOCUMENTS

| | | | |
|---|---|---|---|
| 2008/0210824 A1* | 9/2008 | Eberth | B29C 66/61 |
| | | | 244/131 |
| 2012/0090265 A1* | 4/2012 | McCarville | B64C 1/069 |
| | | | 52/745.19 |
| 2015/0099096 A1* | 4/2015 | Forston | B32B 27/08 |
| | | | 156/244.11 |
| 2015/0217508 A1 | 8/2015 | Rossi et al. | |
| 2016/0009035 A1 | 1/2016 | Zarfos | |

* cited by examiner

AIRCRAFT FLOORING AND METHODS OF MANUFACTURING THE SAME

This application is a continuation-in-part of U.S. patent application Ser. No. 15/625,262 filed Jun. 16, 2017, the contents of which is hereby incorporated by reference herein in its entirety.

This invention was made with government support under Contract No. N68335-15-C-0006 awarded by the Department of the Navy. The government has certain rights in the invention.

BACKGROUND

1. Technical Field

The present disclosure relates generally to composite flooring. More specifically, the present disclosure is directed to thermoplastic composite flooring used in aircraft, and methods for manufacturing the same.

2. Background of Related Art

Composites are made from two or more discreet materials that are fused together to form a product exhibiting superior properties compared to either of the two individual materials. Composites are typically used to manufacture structures used in applications where high-strength and lightweight properties are paramount. For example, composites are often the material of choice for certain components of an aircraft, such as aircraft flooring.

One type of composite is prepreg, which includes fibers (e.g., glass, carbon, or aramid) pre-impregnated with a resin matrix. The resin matrix may include thermoset resins or thermoplastic resins depending on the properties desired in the final composite. The thermoset and thermoplastic resins each have their own drawbacks and advantages. For example, while thermoset resins require less pressure and heat to form composites than do thermoplastic resins, once thermoset resins are cured they cannot be re-processed, whereas thermoplastic resins can be cured multiples times.

There is a continued need for composite floor paneling for cargo aircrafts that is lightweight, exhibits higher levels of damage tolerance/impact resistance, and can be manufactured efficiently and at a low cost.

SUMMARY

The present disclosure provides a floor paneling overcoming the drawbacks of the prior art. In one aspect of the present disclosure, the floor paneling includes a plurality of thermoplastic C-shaped stringers disposed in a parallel arrangement with one another, a consolidated thermoplastic deltoid filler, and thermoplastic upper and lower facing sheets. The deltoid filler is disposed within a longitudinally-extending notch defined by a pair of the stringers. The upper facing sheet covers an upper surface of the stringers and the deltoid filler, and the lower facing sheet covers a lower surface of the stringers and the deltoid filler. The stringers, the deltoid filler, and the upper and lower facing sheets are integrally consolidated forming a unitary construction.

In embodiments, the pair of stringers may be disposed back-to-back. Each of the stringers may have a vertical back and a pair of substantially horizontal flanges extending from respective opposing ends of the vertical back. The horizontal flanges of adjacent stringers may have adjoined edges.

In embodiments, the deltoid filler may include a plurality of thermoplastic sheets, consolidated and machined to a deltoid shape.

In embodiments, each of stringers, the deltoid filler, and the upper and lower facing sheets may be fabricated from a carbon and/or glass fibers with a thermoplastic polymer selected from the group consisting of Poly-Ether-Ether-Ketone (PEEK), Poly-Ether-Ketone-Ketone (PEKK), Polyaryle-ether-ketone (PAEK), polyether-sulphide (PES), polyphenylene-sulphide (PPS), and similar materials.

In embodiments, the stringers, the deltoid filler, and the upper and lower facing sheets may be integrally consolidated via a uniformly-applied compressive force.

In embodiments, the stringers, the deltoid filler, and the upper and lower facing sheets may be integrally consolidated by being heated to a temperature between approximately 700° F. and approximately 800° F. while simultaneously undergoing the uniformly-applied compressive force.

In another aspect of the present disclosure, a method of manufacturing a floor panel for installation in an aircraft is provided. The method includes consolidating a plurality of thermoplastic sheets to form a thermoplastic block having a desired thickness. The thermoplastic block is cut to form consolidated thermoplastic strips. Each thermoplastic strip is machined to form a deltoid filler. A lower facing sheet is positioned on a base of a tool assembly and a plurality of thermoplastic C-shaped stringers are loaded on a plurality of mandrels. A plurality of stringer and mandrel combinations are loaded into the tool assembly to achieve a desired width. The deltoid filler is inserted into a longitudinally-extending notch defined between adjacent stringers, and an upper surface of the stringers is covered with a thermoplastic upper facing sheet to form a pre-consolidated floor panel. The tool assembly applies a uniformly-distributed compressive force on an outer periphery of the pre-consolidated floor panel, thereby integrally consolidating the stringers, the deltoid filler, and the upper and lower facing sheets into a consolidated floor panel.

In some methods, the upper facing sheet and/or the lower facing sheet may extend to cover side surfaces of the outer periphery of the pre-consolidated floor panel in the tool assembly prior to applying the compressive force.

Some methods may further include pinning opposing ends of the plurality of mandrels to a pair of end plates of the tool assembly.

Some methods may further include fixing a first side rail adjacent a first outermost mandrel, positioning a second side rail adjacent a second outermost mandrel, and moving the second side rail toward the first side rail, thereby applying a horizontally-oriented force on the pre-consolidated floor panel.

Some methods may further include torqueing a plurality of bolts disposed along a third side rail that is fixedly disposed adjacent the second side rail, whereby the bolts move the second side rail.

Some methods may further include covering the upper facing sheet with a plate of the tool assembly, and applying a vertically-oriented force on the pre-consolidated floor panel with the plate of the tool assembly while simultaneously applying the horizontally-oriented force on the pre-consolidated floor panel.

Some methods may further include heating the pre-consolidated floor panel to a temperature between approximately 700° F. and approximately 800° F. (lower temperature and pressure for PPS and PES Materials) while simultaneously applying the horizontally-oriented force on the pre-consolidated floor panel.

In some methods, the pre-consolidated floor panel may be heated in an autoclave.

Some methods may further include vacuum sealing both the tool assembly and the pre-consolidated floor panel prior to applying the compressive force.

Some methods may further include detaching the consolidated floor panel from the mandrels by separating a first longitudinal section of a first mandrel from a second longitudinal section of the first mandrel.

In yet another aspect of the present disclosure, a tool assembly for manufacturing a floor panel for installation in an aircraft is provided. The tool assembly includes a base for supporting a pre-consolidated floor panel thereon, a plurality of mandrels supported on the base and oriented in a parallel arrangement with one another, a pair of end plates disposed adjacent respective opposing ends of the mandrels, an upper plate, and first and second side rails. The mandrels are configured to be received in a pair of C-shaped stringers, and the upper plate is configured to be disposed on the mandrels. The first side rail is fixed to the base at a location adjacent a first outermost mandrel, and the second side rail is supported on the base at a location adjacent a second outermost mandrel. The second side rail is configured to move along the base and relative to the first side rail to apply a horizontally-oriented force on the pre-consolidated floor panel.

In some embodiments, the tool assembly may further include a third side rail fixedly disposed adjacent the second side rail, and a plurality of bolts disposed along the third side rail. The bolts are configured to move the second side rail in response to a rotation of the plurality of loaded bolts.

In some embodiments, the second side rail is moved using actuated piston/cylinders instead of bolts. The cylinders may be pneumatic or hydraulic actuated piston(s)/cylinders, providing the proper horizontal pressure for panel consolidation.

In some embodiments, the second side rail is moved using a 3D heated platen press with built-in pneumatic or hydraulic side actuators to provide horizontal side pressure to consolidate the panel.

Further details, advantages, and aspects of exemplary embodiments of the present disclosure are described in more detail below with reference to the appended figures.

As used herein, the terms parallel and perpendicular are understood to include relative configurations that are substantially parallel and substantially perpendicular up to about + or −10 degrees from true parallel and true perpendicular.

BRIEF DESCRIPTION OF THE DRAWINGS

Embodiments of the present disclosure are described herein with reference to the accompanying drawings, wherein.

DETAILED DESCRIPTION

Figure 1:
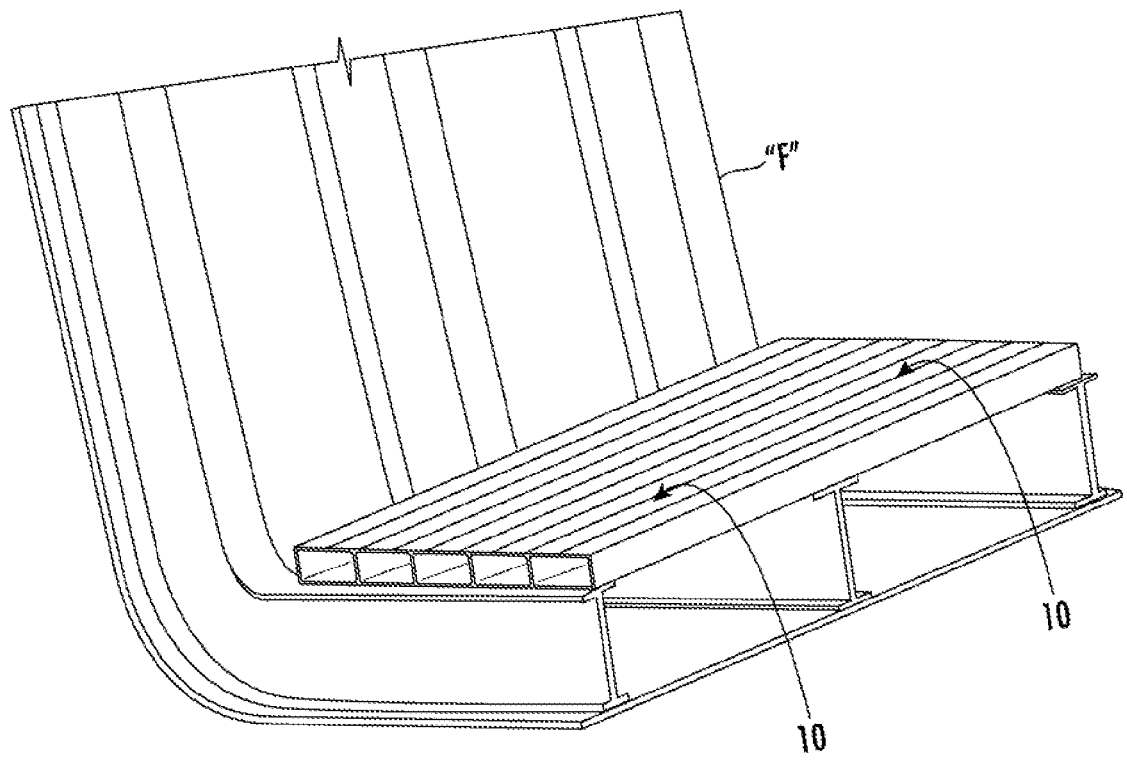
FIG. 1 is a perspective view of floor paneling fastened to a frame within an aircraft.

Embodiments of the presently disclosed floor paneling and tool assembly used to manufacture the floor paneling are described in detail with reference to the drawings, in which like reference numerals designate identical or corresponding elements in each of the several views.

The present disclosure provides a unitized thermoplastic floor panel used in aerospace applications, a tool assembly for manufacturing the floor panel, and methods of manufacturing the floor panel. The floor panel is integrally consolidated using multi-axis, simultaneous pressure compression molding. Using this approach, the entire unitized integral assembly consisting of upper and lower facing sheets, longitudinal box stringers, and deltoid fillers (in the void between the box stringer corner radii and facing sheets) is designed, fabricated, and is consolidated as a one-piece unitized structure. Consolidation may be performed using a platen press applying multi-axis simultaneous pressure on all surfaces (top, bottom, and sides), or an autoclave. Further disclosed are stringer internal mandrels that are split along their length and incorporate unique push-out bolts to facilitate easy removal of the internal mandrels from the unitized floor panel after consolidation.

The combined design and integrated tooling and manufacturing approach yields a floor panel structure that achieves the optimum balance between low weight, low cost, and damage tolerance. Thermoplastic box section stringers (made from consolidated back-to-back C-section stringers) are re-consolidated with deltoid filler plies in the corners and with the upper and lower facing sheets in a matched tooling assembly. Use of the box stringers (back-to-back C-section stringers adjoined at the flange tips) with the deltoid fillers provides an even overall panel stiffness, ease of fabrication, and the desired concentric vertical load introduction/reaction path for cargo and impact loads, and weight optimization. Vertical webs of the box stringers act as panel breakers to increase the buckling stability strength of the upper and lower facing sheets as well as being sized for strength and stability. The box stringers, together with the upper and lower facing sheets, act as a box beam to accumulate the vertical applied cargo loads and transfer them to the aircraft support frames.

The structural configuration of the floor panel eliminates crushing/delamination in the corner radius between the skin and stiffener radii experienced with other thermoplastic and thermoset floor panel designs, and eliminates issues of the skin thickness variation between stringers. This design also eliminates issues of the skin thickness variation between stringers that would otherwise cause difficulties in final consolidation of such thermoplastic floor panel configurations.

In embodiments, the individual components of the floor panel, including the deltoid fillers, the upper and lower facing sheets, and the box stringers, are fabricated using pairs of ±45° plies placed in 90° offset layers close to the surface to maximize transverse bending stiffness for normal load conditions/paths (cargo and high energy impact load).

The concentric design, in combination with the thermoplastic section and sequencing of the material, eliminates any eccentric load path potentials that would otherwise be detrimental to the survival of the structure under extreme load conditions, especially high energy concentrated impact force. This design is ideal for highly loaded cargo aircraft and rotorcraft with its inherent light weight impact resistant construction.

With reference to FIGS. 1-3C, a floor panel, such as an aircraft floor panel 10, is illustrated and is configured to be installed in or on a frame "F" of an aircraft. It is contemplated that the floor panels 10 of the present disclosure may be suitable for use in other applications, e.g., motor vehicles and watercrafts. As illustrated in FIG. 1, a plurality of the disclosed floor panels 10 may be assembled side-by-side and fastened to the frame "F" of an aircraft to provide a flooring that is damage-tolerant and light in weight.

The floor panel 10 generally includes a plurality of C-shaped stringers 12, a plurality of deltoid fillers 14, and upper and lower face sheets 16a, 16b, all of which being integrally consolidated using a manufacturing process described herein that results in the floor panel 10 having a unitary construction. The stringers 12 are elongated bars of consolidated thermoplastic composite. The stringers 12 are linear and oriented in parallel arrangement relative to one another.

Figure 2:
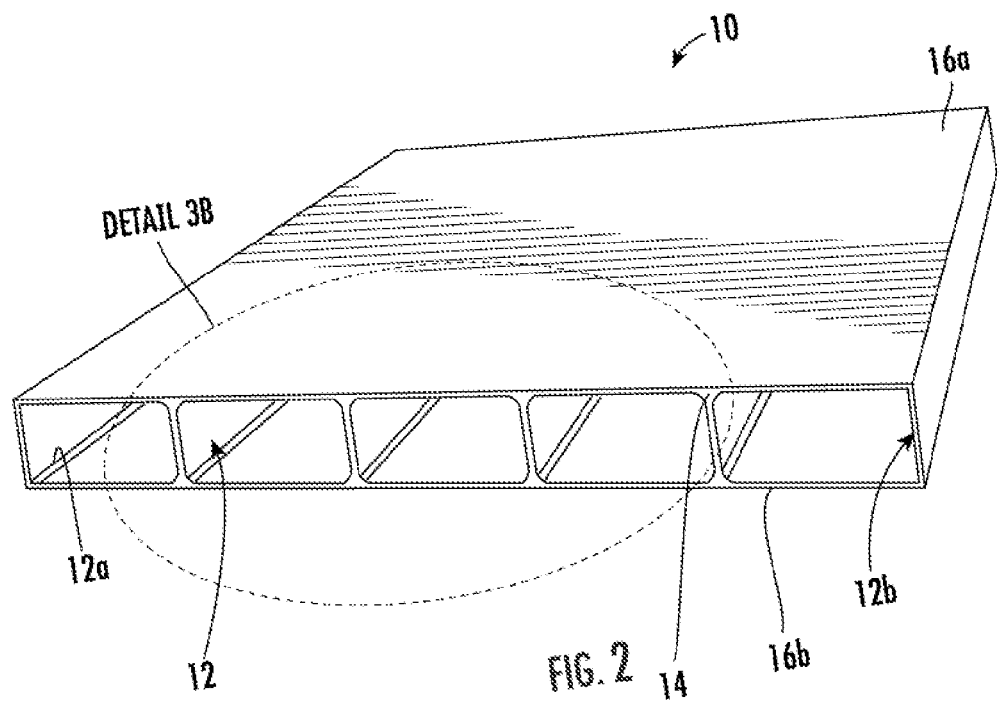
FIG. 2 is a perspective view of a discreet, integrally consolidated floor panel of the floor paneling shown in FIG. 1.
Figure 3A:
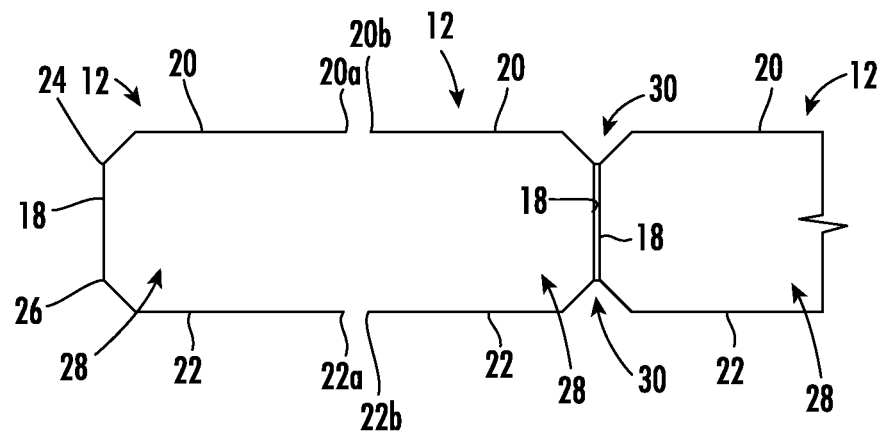
FIG. 3A is an enlarged, plan view of three stringers of the floor panel of FIG. 2.

With reference to FIG. 3A, each of the stringers 12 has a vertical back 18 and a pair of horizontal flanges 20, 22 extending substantially perpendicularly from opposing ends 24, 26 of the vertical back 18. The stringers 12 are arranged in pairs with their respective vertical backs 18 abutting one another. Each of the stringers 12 defines an open, C-shaped channel 28 that extends along the length of the stringers 12. It is envisioned that the term C-shaped includes slight variations from the literal shape of a C, including U-shaped, an arcuate shape, or a square shape. The flanges 20, 22 of one stringer 12 have their edges 20a, 22a in abutting engagement with the edges 20b, 22b of the flanges 20, 22 of an adjacent stringer 12, such that the channels 28 of the two stringers 12 cooperatively form a closed conduit. The flanges 20, 22 of the back-to-back stringers 12 bend from the respective vertical backs 18 in such a way as to form longitudinally-extending notches 30 between the adjacent stringers 12. A corner notch is also defined at the two end stringers 12a, 12b (FIG. 2).

Figure 3B:
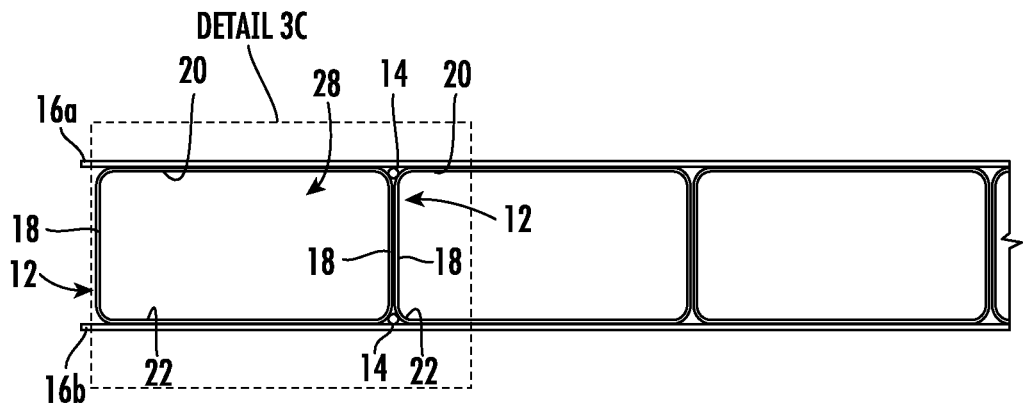
FIG. 3B is an enlarged view of the area of detail demarcated "detail 3B" in FIG. 2.
Figure 3C:
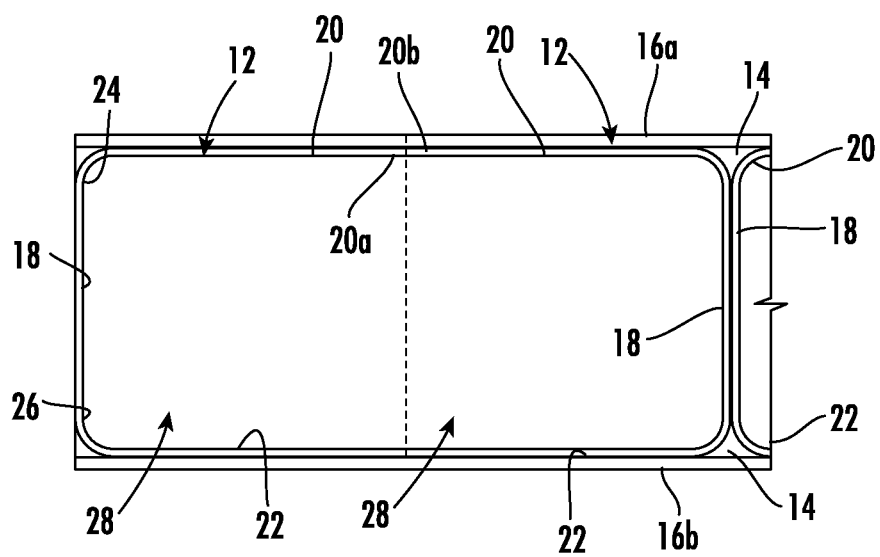
FIG. 3C is an enlarged view of the area of detail demarcated "detail 3C" in FIG. 3B.

With reference to FIGS. 3B and 3C, the deltoid fillers 14 are fabricated from consolidated thermoplastic sheets or plies. The deltoid fillers 12 are received within the notches 30 defined between each pair of back-to-back stringers 12 and in the corner notches at the outermost stringers 12a, 12b. To form the deltoid fillers 14, a plurality of thermoplastic sheets or plies are consolidated using heat and pressure to form a thermoplastic block having a desired thickness, such as a thickness matching a height of the notches 30 of the stringers 12. The thermoplastic block is cut along its length to form consolidated thermoplastic strips, which are then machined to form discreet deltoid fillers 14.

The upper and lower facing sheets 16a, 16b of the floor panel 10 are each a consolidated thermoplastic composite and surround the outer periphery of the stringers 12 and the deltoid fillers 14. The upper facing sheet 16a covers an upper surface of the stringers 12 and deltoid fillers 14 and wraps around an upper half of the vertical backs 18 of the outermost stringers 12a, 12b. The lower facing sheet 16b covers a lower surface of the stringers 12 and deltoid fillers 14 and wraps around a lower half of the vertical backs 18 of the outermost stringers 12a, 12b, such that the upper and lower facing sheets 16a, 16b together surround the entire outer peripheral surface of the stringers 12 and deltoid fillers 14. The stringers 12, the deltoid fillers 14, and the upper and lower facing sheets 16a, 16b are integrally consolidated forming a unitary structure that is resilient, exhibits high damage tolerance, and is light in weight.

Each of the stringers 12, the deltoid fillers 14, and the upper and lower facing sheets 16a, 16b may be fabricated from carbon and/or glass fibers with a thermoplastic polymer selected from the group consisting of Poly-Ether-Ether-Ketone (PEEK), Poly-Ether-Ketone-Ketone (PEKK), Polyaryletherketone (PAEK), polyether-sulphide (PES), polyphenylene-sulphide (PPS), and similar materials.

Figure 4A:
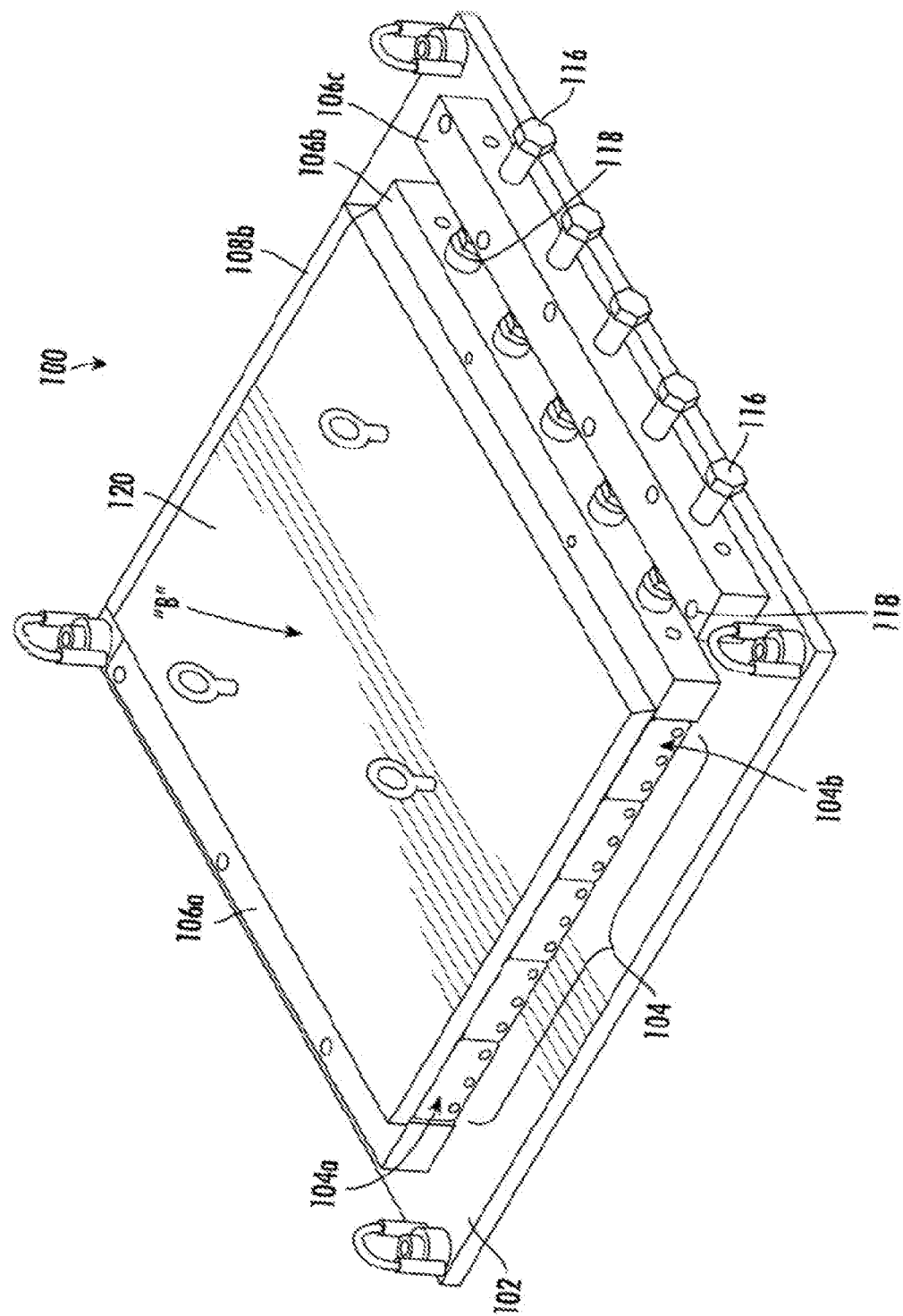
FIG. 4A is a perspective view of components of a tool assembly used to manufacture the floor panel of FIG. 2 in accordance with the principles and methods of the present disclosure.
Figure 4B:
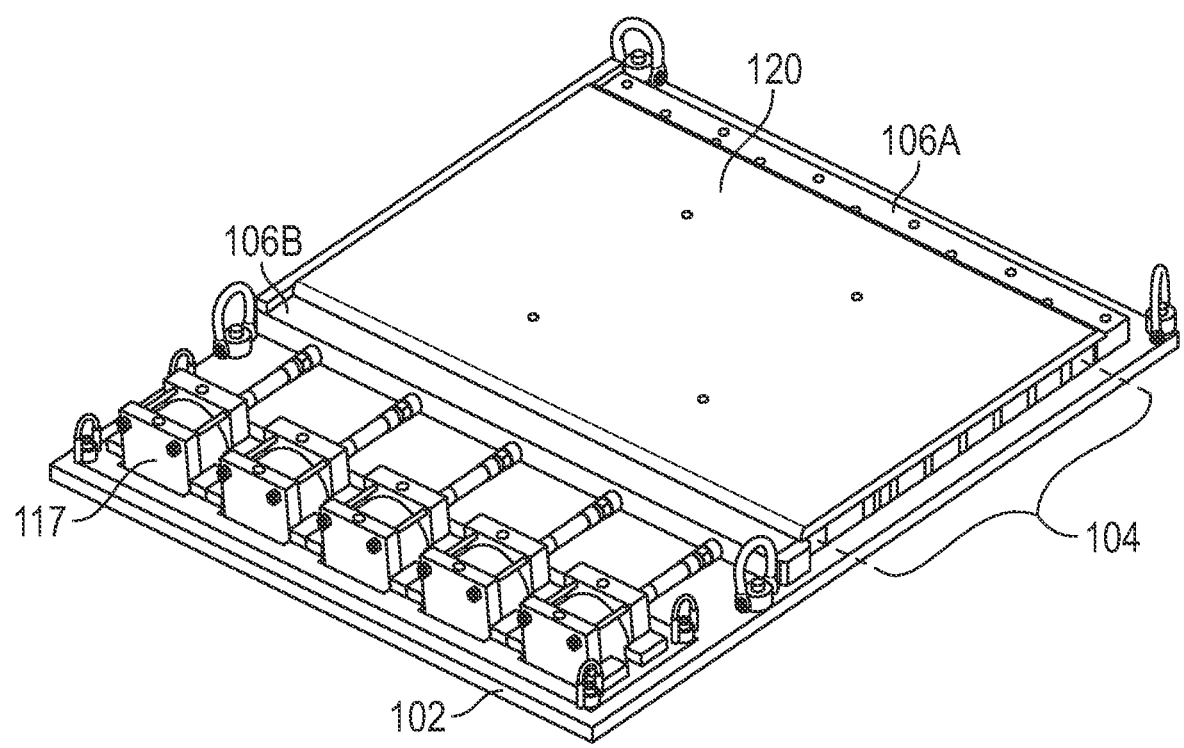
FIG. 4B is a perspective view of components of another embodiment of a tool assembly used to manufacture the floor panel of FIG. 2 in accordance with the principals and methods of the present disclosure.
Figure 5:
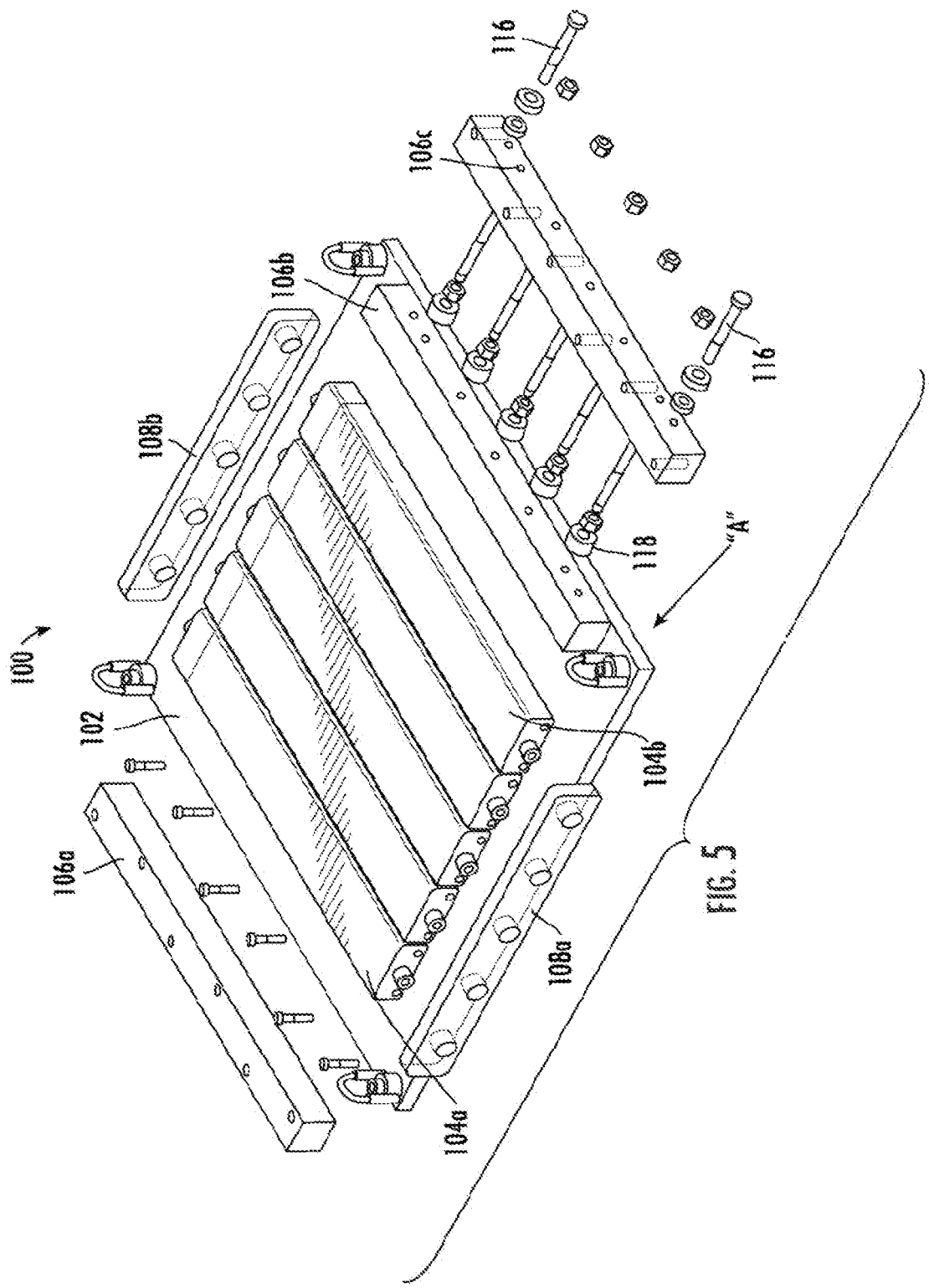
FIG. 5 is an exploded view of components of the tool assembly of FIG. 4.
Figure 6:
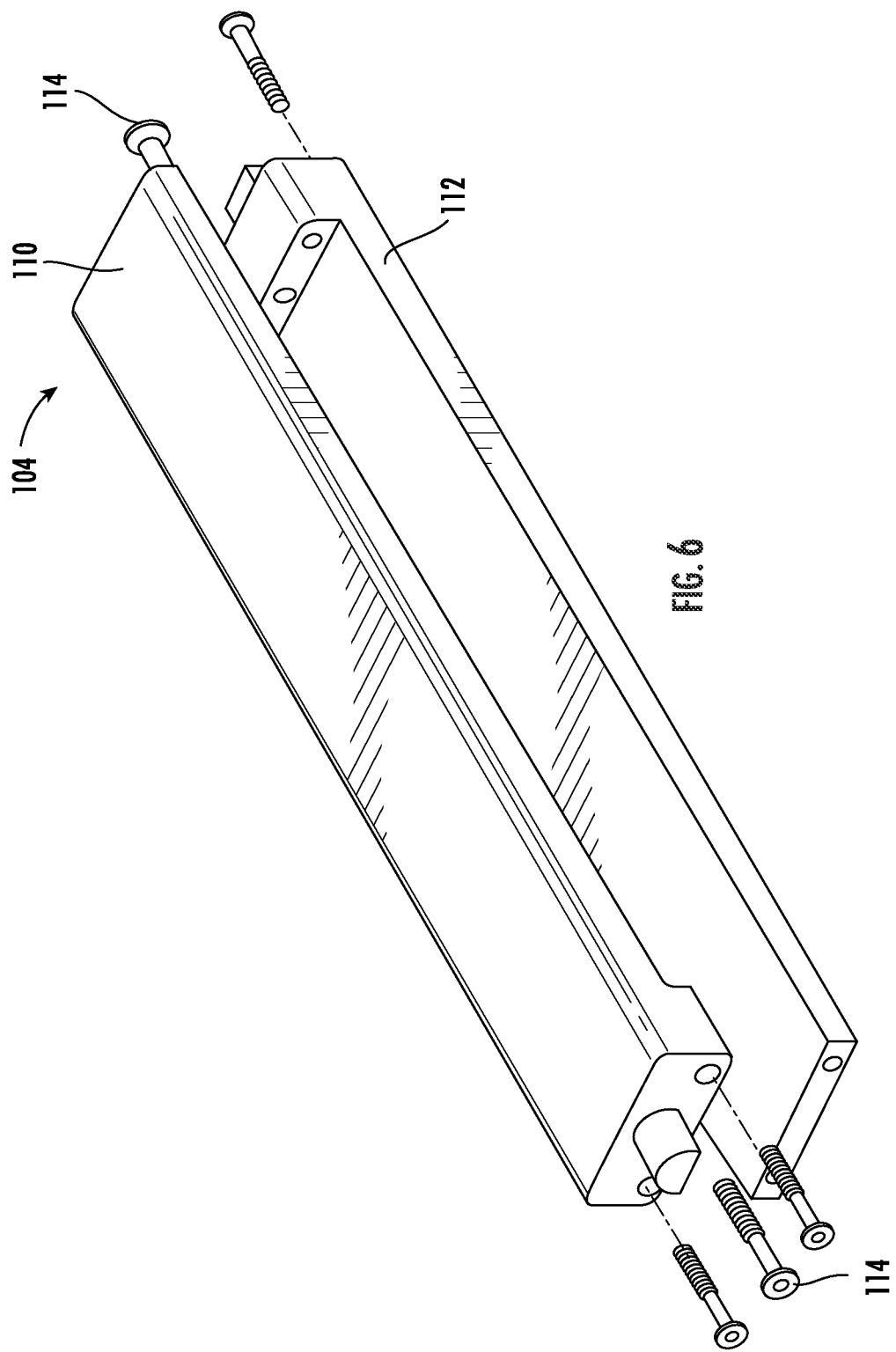
FIG. 6 is an exploded view of a mandrel of the tool assembly of FIG. 5.

With reference to FIGS. 4-6, a tool assembly 100 for manufacturing the floor panel 10 is illustrated. The tool assembly 100 is configured to apply a uniform compressive force to the floor panel 10 to integrally consolidate the floor panel 10. The tool assembly 100 generally includes a base 102, a plurality of mandrels 104 supported on the base 102, and first and second side rails 106a, 106b.

The mandrels 104 are configured to be detachably coupled (e.g., pinned) to end plates 108a, 108b that are fixed to the base 102. When the mandrels 104 are held between the end plates 108a, 108b at their opposing ends, the mandrels 104 are oriented in a parallel arrangement with one another to define planar upper and lower surfaces. Each mandrel 104 is rectangular and has lateral sides dimensioned for receipt in respective C-channels 28 (FIG. 3A) of the stringers 12. The mandrels 104 include a first longitudinal section 110 and a second longitudinal section 112 detachably connected to one another via fasteners, such as, for example, push-out bolts 114. Constructing the mandrels 104 from split longitudinal sections 110, 112 facilitates removal of the floor panel 10 after formation thereof, as will be described herein.

The first side rail 106a of the tool assembly 100 is fixed to the base 102 at a location adjacent a first outermost mandrel 104a, and the second rail 106b is supported on the base 102 at a location adjacent a second outermost mandrel 104b, opposite the first outermost mandrel 104a. The second side rail 106b is not fixed to the base 102 so as to be slidable along the base 102 in a direction indicated by arrow "A" in FIG. 5. The tool assembly 100 further includes a third side rail 106c fixed to the base 102 at a location outside of and adjacent the second side rail 106b, such that the second side rail 106b is disposed between the second outermost mandrel 104b and the third side rail 106c. The third side rail 106c includes a series of fasteners, such as, for example, bolts 116, threadedly coupled thereto. The bolts 116 may be evenly spaced along the length of the third side rail 106c. Rotation of the bolts 116 may cause ends of the bolts 116 to compress Belleville springs 118 coupled to the second side rail 106b, which drives a horizontally-oriented motion of the second side rail 106b in the direction "A" along the base 102.

As an alternative to bolts 116 and Belleville springs 118, cylinder(s)/piston(s) 117 may be used to provide the horizontal force to side rail 106b on plate 102 surface as part of the consolidation process. Cylinder/pistons 117 may be either hydraulic or pneumatic side actuators to provide horizontal side pressure to consolidate the panels.

As a further alternative to bolts 116 a 3D heated platen press with built in pneumatic or hydraulic actuators may be used to provide horizontal side pressure to consolidate the panels.

The tool assembly 100 may further include an upper plate 120 disposed on the mandrels 104 and which may be configured to be coupled to a press (not shown) that applies a vertical (i.e., downward) force on the tool assembly 100 indicated by arrow "B" in FIG. 4. When the floor panel 10, in its pre-consolidated form, is disposed within the tool assembly 100, the mandrels 104 of the tool assembly 100 extend through the channels 28 of the adjacent stringers 12 of the floor panel 10, and the entire outer periphery of the floor panel 10 is surrounded by the tool assembly 100.

To manufacture the floor panel 10, the individual components thereof (e.g., the stringers 12, the deltoid fillers 14, and the upper and lower facing sheets 16a, 16b) are formed, assembled to one another in the tool assembly 100, and integrally consolidated using heat and a uniformly-distributed compressive force applied by the tool assembly 100 in a heated platen press (or in an autoclave). In particular, to form the deltoid fillers 14, a plurality of thermoplastic sheets or plies are consolidated using heat and pressure to form a thermoplastic block having a desired thickness, such as a thickness matching a height of the notches 30 of the stringers 12. The thermoplastic block is cut along its length to form consolidated thermoplastic strips, which are then machined to form discreet deltoid fillers 14. The stringers 12 and the upper and lower facing sheets 16a, 16b are thermoplastic composites machined and cut from a plurality of consolidated thermoplastic sheets.

The lower facing sheet 16b is positioned on the base 102 of the tool assembly 100 and the stringers 12 are loaded onto the mandrels 104. To load the stringers 12 onto the mandrels 104, each mandrel 104 is removed from the tool assembly 100 and received within the channels 28 of a pair of stringers 12. Upon loading a mandrel 104 with a pair of stringers 28, the stringer 12 and mandrel 104 combinations are sequentially loaded into the tool assembly 100 by fixing the ends of the mandrels 104 to the end plates 108a, 108b of the tool assembly 100. The deltoid fillers 14 are inserted into the notches 30 defined between a pair of stringers 12 disposed on adjacent mandrels 104, and the upper facing sheet 16a is laid on top of the stringers 12. The upper and lower facing sheets 16a, 16b are wrapped around the side surfaces of the outermost stringers 12a, 12b.

The first side rail 106a of the tool assembly 100 is fixed to the base 102 adjacent the first outermost mandrel 104a, and the second side rail 106b of the tool assembly 100 is positioned adjacent the second outermost mandrel 104b. The plate 120 of the tool assembly 100 is positioned on the upper facing sheet 16a, whereby the tool assembly 100 surrounds the entire outer periphery of the floor panel 10. At this stage, while the stringers 12, deltoid fillers 14, and upper and lower facing sheets 16a, 16b are assembled and held together in the tool assembly 100, the floor panel 10 is in a pre-consolidated state.

To transition the floor panel 10 from the pre-consolidated state to a consolidated state, the tool assembly 100, with the pre-consolidated floor panel 10 assembled therein, is vacuum bagged/sealed and placed in an autoclave. The autoclave is heated to a temperature between approximately 700° F. and approximately 800° F. (for carbon-glass/PEEK materials), and in some methods between approximately 720° F. and approximately 750° F.

When consolidated in a press, the floor panel 10 is locked in between the end rails 106a and 106b, the bolts 116 of the third side rail 106c are torqued simultaneously and at the same rate as one another to drive the second side rail 106b toward the first side rail 106a in the direction "A." In some embodiments, the second side rail 106b may be moved via any suitable mechanism, such as pneumatics, motors, or the like. As the second side rail 106b moves toward the first side rail 106a, the first and second side rails 106a, 106b exert a horizontally-oriented compressive force on the floor panel 10. In addition, since the end plates 108a, 108b of the tool assembly 100 are fixed to the base 102, the ends of the floor panel 10 are prevented from sliding under the compressive force of the side rails 106a, 106b.

Concurrently with the application of the horizontally-oriented force via the side rails 106a, 106b, the press is activated to apply a vertically-oriented force, in the direction indicated by arrow "B" in FIG. 4, on the pre-consolidated floor panel 10. The combined vertically-oriented and horizontally-oriented compressive force imparted on the floor panel 10 by the tool assembly 100 is between approximately 200 psi and approximately 300 psi. These pressure and temperature conditions are held for a suitable amount of time, such as, for example, approximately 30 minutes, at the end of which the floor panel 10 is an integrally consolidated, unitary structure.

To facilitate removal of the consolidated floor panel 10 from the tool assembly 100, the end plates 108a, 108b of the tool assembly 100 are removed, and the longitudinal sections 110, 112 of each mandrel 104 are split by removing the push-out bolts 114.

It is contemplated that the floor panel 10 may assume a trapezoidal shape, where the combined mandrels can form up to a 30 Degree slope from one extreme edge to the opposite extreme edge, utilizing vectored force resultants from the spring-loaded bolts It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

The invention claimed is:

1. A method of manufacturing a floor panel for installation in an aircraft, comprising: consolidating a plurality of Carbon-Glass/thermoplastic sheets to form a thermoplastic block having a desired thickness; cutting the thermoplastic block to form consolidated strips; machining each thermoplastic strip to form a deltoid filler; positioning a thermoplastic lower facing sheet on a base of a tool assembly; loading a plurality of thermoplastic C-shaped stringers on a plurality of mandrels; loading a plurality of stringer and mandrel combinations into the tool assembly to achieve a desired width; inserting the deltoid filler into a longitudinally-extending notch defined between adjacent stringers of the plurality of stringers; covering an upper surface of the plurality of stringers with a thermoplastic upper facing sheet to form a pre-consolidated floor panel; and applying, via the tool assembly, a uniformly-distributed compressive force on an outer periphery of the pre-consolidated floor panel, thereby integrally consolidating the plurality of stringers, the deltoid filler, and the upper and lower facing sheets into a consolidated floor panel; fixing a first side rail adjacent a first outermost mandrel of the plurality of mandrels; positioning a second side rail adjacent a second outermost mandrel of the plurality of mandrels; and moving the second side rail toward the first side rail, thereby applying a horizontally-oriented force on the pre-consolidated floor panel.

2. The method according to claim 1, wherein at least one of the upper facing sheet or the lower facing sheet extends to cover side surfaces of the outer periphery of the pre-consolidated floor panel in the tool assembly prior to applying the compressive force.

3. The method accordong to claim 1, further comprising pinning opposing ends of the plurality of mandrels to a pair of end plates of the tool assembly.

4. The method according to claim 1, further comprising torqueing a plurality of bolts disposed along a third side rail that is fixedly disposed adjacent the second side rail, whereby the plurality of bolts moves the second side rail.

5. The method according to claim 1, further comprising: covering the upper facing sheet with a plate of the tool assembly; and applying a vertically-oriented force on the pre-consolidated floor panel with the plate of the tool assembly while simultaneously applying the horizontally-oriented force on the pre- consolidated floor panel.

6. The method according to claim 1, further comprising heating the pre-consolidated floor panel to a temperature between approximately 7000 F and approximately 8000 F while simultaneously applying the horizontally-oriented force on the pre-consolidated floor panel.

7. The method according to claim 6, wherein the pre-consolidated floor panel is heated in an autoclave.

8. The method according to claim 7, further comprising vacuum sealing both the tool assembly and the pre-consolidated floor panel prior to applying the compressive force in the autoclave.

9. The method according to claim 1, further comprising detaching the consolidated floor panel from the plurality of mandrels by separating a first longitudinal section of at least one of the mandrels of the plurality of mandrels from a second longitudinal section of the at least one mandrel.

* * * * *